(12) United States Patent
Lim et al.

(10) Patent No.: US 6,577,345 B1
(45) Date of Patent: Jun. 10, 2003

(54) DEINTERLACING METHOD AND APPARATUS BASED ON MOTION-COMPENSATED INTERPOLATION AND EDGE-DIRECTIONAL INTERPOLATION

(75) Inventors: Il Taek Lim, Seoul (KR); Kyoung Won Lim, Seoul (KR); Cheol Hong Min, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/626,798

(22) Filed: Jul. 26, 2000

(30) Foreign Application Priority Data

Jul. 29, 1999 (KR) ............................................. 99-30983

(51) Int. Cl.⁷ ........................... H04N 7/01; H04N 11/20
(52) U.S. Cl. ....................................... 348/452; 348/448
(58) Field of Search ................................. 348/451, 452, 348/448, 449; H04N 7/01, 11/20

(56) References Cited

U.S. PATENT DOCUMENTS

| | | | | |
|---|---|---|---|---|
| 4,684,985 A | * | 8/1987 | Nakagaki et al. ........... 358/140 |
| 4,989,090 A | * | 1/1991 | Campbell et al. ........... 358/140 |
| 5,475,438 A | * | 12/1995 | Bretl ............................ 348/452 |
| 5,519,451 A | * | 5/1996 | Clatanoff et al. ........... 348/606 |
| 5,661,525 A | * | 8/1997 | Kovacevic et al. ......... 348/452 |
| 5,784,115 A | * | 7/1998 | Bozdagi ..................... 348/452 |
| 5,886,745 A | * | 3/1999 | Muraji et al. ............... 348/441 |
| 5,936,676 A | * | 8/1999 | Ledinh et al. ............... 348/452 |
| 5,943,099 A | * | 8/1999 | Kim ............................ 348/448 |
| 6,141,056 A | * | 10/2000 | Westerman ................. 348/448 |
| 6,181,382 B1 | * | 1/2001 | Kieu et al. .................. 348/459 |
| 6,259,480 B1 | * | 7/2001 | Yamauchi et al. .......... 348/452 |
| 6,262,773 B1 | * | 7/2001 | Westerman ................. 348/448 |

\* cited by examiner

Primary Examiner—John Miller
Assistant Examiner—Brian Yenke
(74) Attorney, Agent, or Firm—Fleshner & Kim, LLP

(57) ABSTRACT

Disclosed are a deinterlacing method and apparatus based on a motion-compensated interpolation (MCI) and an edge-directional interpolation (EDI). The disclosed deinterlacing method and apparatus are characterized in that the deinterlacing of a video is conducted using both the MCI and EDI schemes in a single deinterlacing system. An input video signal of an interlaced scan format passes through an MCI block, an EDI block, and a line averaging interpolation (LAI) block, respectively. Respective resultant video signals outputted from the MCI and EDI blocks then pass through MCI and EDI side-effect checking blocks. Based on the checking results outputted from the side-effect checking blocks, a decision and combination block selects a desired one of the MCI, EDI, LAI pixel indices. The decision and combination block selects an output from the MCI block when MCI is superior whereas it selects an output from the EDI block when EDI is superior. Where neither MCI nor EDI is satisfactory, an output from the LAI block is selected. When both the MCI and EDI are satisfactory, an average of the MCI and EDI values is derived and outputted as a deinterlaced pixel index.

12 Claims, 1 Drawing Sheet

DEINTERLACING METHOD AND APPARATUS BASED ON MOTION-COMPENSATED INTERPOLATION AND EDGE-DIRECTIONAL INTERPOLATION

BACKGROUND OF THE INVENTION

1. Field of the Invention

The present invention relates to a deinterlacing method and apparatus based on a motion-compensated interpolation (MCI) and an edge-directional interpolation (EDI).

In particular, the present invention relates to a method for converting video signals of an interlaced scanning format into those of a progressive scanning format, that is, a deinterlacing method for video signals. Also, the present invention relates to an apparatus for converting video signals of the interlaced scanning format into those of the progressive scanning format, that is, a deinterlacing apparatus for video signals.

More particularly, the present invention relates to a deinterlacing method and apparatus for video signals in which both a motion compensated interpolation (MCI) and an edge directional interpolation (EDI) are taken into consideration in a conversion of video signals of an interlaced scanning format into those of a progressive scanning format.

Furthermore, the present invention relates to a deinterlacing method and apparatus for video signals based on an MCI and an EDI, in which a deinterlacing of video signals, that is, a conversion of video signals of an interlaced scanning format into those of a progressive scanning format is carried out, taking into consideration a line averaging interpolation (LAI) along with the MCI and EDI.

2. Description of the Prior Art

In present television systems, a specific scan format so called an "interlaced scan format" is adopted. In accordance with an interlaced scanning format for NTSC systems, odd and even lines of 525 scan lines are outputted to a display in an alternating fashion at intervals of a ⅟60 second for every picture. On the other hand, odd and even lines of 625 scan lines are outputted to a display in an alternating fashion at intervals of a ⅟60 second for every picture in accordance with an interlaced scan format for PAL systems.

Here, respective pictures outputted at intervals of a ⅟60 second are referred to as "fields". A complete picture consisting of two fields is referred to as a "frame".

A field consisting of odd scan lines is referred to as an "odd field" or a "top field" whereas a field consisting of even scan lines is referred to as an "even field" or a "bottom field".

The interlaced scan format, in which every frame is outputted to a display in a state divided into two fields, provides an advantage in that it can reduce the bandwidth of TV signals by ½, as compared to a non-interlaced progressive scan format in which all scan lines of every frame are outputted in a ⅟60 second.

If the present NTSC television system, which uses a bandwidth of 6 MHz by virtue of the above mentioned interlaced scan format adopted thereby, did not adopt the interlaced scan format, they would require a bandwidth of about 12 MHz.

In spite of an advantage in that the bandwidth required for signal processing can be reduced, the interlaced scan format involves a drawback in that when a video having horizontal fine line patterns is displayed on a display, those fine line patterns may be chattered at a frame frequency of 30 Hz. That is, a large-area flickering phenomenon may occur.

Where the video displayed on the display contains an object flickering at 30 Hz, there is a problem in that fine line patterns may be viewed in an overlapped state over the object.

The above mentioned phenomena, which result in a degradation in picture quality, are inevitably involved in the interlaced scan format.

However, the advent of digital TV systems has caused picture quality to be considered as a very important factor.

Advanced Television Systems Committee (ATSC) standard for digital TV signals adopts both the progressive scan format and the interlaced scan format.

For instance, TV standard for a size of 704 pels * 480 lines adopt a 60 Hz progressive scan format and a 60 Hz interlaced scan format.

In the case of a digital TV receiver adopting a progressive scan format, video signals of an interlaced scan format should be converted into those of a progressive scan format.

On the other hand, where TV signals are to be displayed on the monitor of a PC via a TV receiver card mounted to the PC, it is necessary to convert TV signals of an interlaced scan format into those of a progressive scan format because the monitor can display only videos of the progressive scan format.

Thus, the conversion of video signals from the interlaced scan format into the progressive scan format is essentially required in various cases.

Mainly, there are two methods for the conversion of video signals from the interlaced scan format into the progressive scan format.

The first method is an inter-field interpolation, and the second method is an intra-field interpolation.

A simple example of the inter-field interpolation is a weave method in which one frame is formed by combining one top field and one bottom field.

In accordance with this method, however, horizontal lines disturbing to the eye are formed at a moving portion of the displayed video even though a good display result is obtained in associated with the still portion of the video. This is because there is a timing difference between the two fields.

A more complex example of the inter-field interpolation is a motion-compensated interpolation.

In accordance with the motion-compensated interpolation, motion information is extracted from a frame in order to conduct a desired line interpolation. Based on the extracted motion information, empty lines of the current field are interpolated by the previous field or the further previous field.

In this case, it is important to allow the motion compensation to be accurately carried out.

Meanwhile, a simple example of the intra-field interpolation is a bob method in which one frame is formed using the scanning lines of one field two times.

In accordance with this method, it is possible to prevent horizontal lines disturbing to the eye from being formed at a moving portion of the displayed video. However, there is a complexity in forming frames. Furthermore, the fine portions of the displayed video may be chattered at 30 Hz.

A more complex example of the intra-field interpolation is an edge-directional interpolation (EDI).

In accordance with this EDI, only the pixels of the current field are used to interpolate the empty lines of the current field. In particular, the directions of edges are detected in order to carry out the interpolation based on the information detected.

Therefore, it is important to detect the edge directions to be accurately.

Generally, one of the above mentioned methods, either, MCI or EDI, is selectively used for conventional deinterlacing techniques.

Most commercially available TV receiver cards allowing TV signals to be displayed on a PC monitor are configured to select a desired one of bob and weave modes using a control program.

Even in the case in which a complicated algorithm is implemented using a VLSI chip, a fundamental type of the EDI is implemented in most cases.

For the MCI, there are few examples in which a deinterlacing chip is used.

However, where both the MCI and EDI are used, it is expected to obtain a further excellent picture quality because the MCI and EDI exhibit very different characteristics from each other.

SUMMARY OF THE INVENTION

The present invention describes a deinterlacing algorithm adapted to use both the MCI and EDI.

The present invention proposes a deinterlacing method and apparatus capable of using an effective combination of MCI and EDI.

The present invention also proposes a deinterlacing method and apparatus capable of using an effective combination of MCI, EDI, and LAI (Line Averaging Interpolation).

In accordance with the present invention, a deinterlacing process for a video is conducted using MCI where the video has a large part of complex and fine video region and is still or slow moving region in a horizontal direction.

Where a video is distinct and has elongated edges, a deinterlacing process for the video is conducted using EDI in accordance with the present invention.

Where both the MCI and EDI are applied, an average value of two pixels respectively interlaced using the MCI and EDI is outputted as a final deinterlacing result in accordance with the present invention.

On the other hand, in the case in which neither MCI nor EDI can be applied, the result of LAI is outputted as a final deinterlacing result in accordance with the present invention.

That is, the present invention provides a deinterlacing method which involves determining whether or not respective results of MCI and EDI conducted are satisfactory, selecting a desired one from the results of MCI, EDI, and LAI, and a combination of MCI and EDI results, based on the result of the determination, and outputting the selected result as a final deinterlacing result.

The deinterlacing method based on MCI and EDI according to the present invention is characterized in that it is carried out in the following sequence:

(a) a deinterlacing procedure for deinterlacing an input video signal of an interlaced scan format in accordance with MCI and EDI schemes, respectively;

(b) a side-effect checking procedure for checking whether or not the result of the deinterlacing procedure according to the MCI scheme is satisfactory and for checking whether or not the result of the deinterlacing procedure according to the EDI scheme is satisfactory; and (c) a result outputting procedure for selectively outputting, as a final deinterlacing result, the value of the MCI deinterlacing result, the value of the EDI deinterlacing result, or a combined value of the MCI and EDI deinterlacing results, based on the result of the side-effect checking.

The value to be outputted as the final deinterlacing result in the procedure (c) based on the result of the side-effect checking conducted in the procedure (b) is determined as follows.

Where a selected one of the MCI and EDI deinterlacing results is satisfactory, this value is outputted as the final deinterlacing result.

When both the MCI deinterlacing result and the EDI deinterlacing result are satisfactory, the MCI and EDI deinterlacing results are combined together. In this case, the combined value is outputted as the final deinterlacing result.

Alternatively, an LAI deinterlacing process may be conducted along with the MCI and EDI deinterlacing processes. In this case, the value of the LAI deinterlacing result is outputted as a final deinterlacing result when neither the MCI deinterlacing result nor the EDI deinterlacing result is satisfactory.

BRIEF DESCRIPTION OF THE DRAWINGS

The above objects, and other features and advantages of the present invention will become more apparent from the following detailed description when taken in conjunction with the drawings, in which.

DETAILED DESCRIPTION OF THE PREFERRED EMBODIMENTS

MCI and EDI are very different from each other in terms of characteristics.

In other words, MCI and EDI algorithms exhibit superior effects for different types of videos, respectively.

MCI operates effectively where a video to be processed has a large part of complex and fine video regions and is still or moves slowly.

This is because it is difficult to detect an accurate motion for dull portions of a picture and portions of the picture moving very fast. In particular, the reason why it is difficult to detect an accurate motion for the portions of the picture moving very fast is that the picture may be collapsed.

Furthermore, where the picture slowly moves in a vertical direction, this movement is likely to reach a critical velocity.

Here, the critical velocity corresponds to a velocity at which a video (pixel) moves upwardly or downwardly by a distance corresponding to a ½ pixel for a 1/60 second.

In this case, there is no original pixel to be interpolated, even if the video movement is accurately determined.

This will be described in detail hereinafter.

Figure 1:
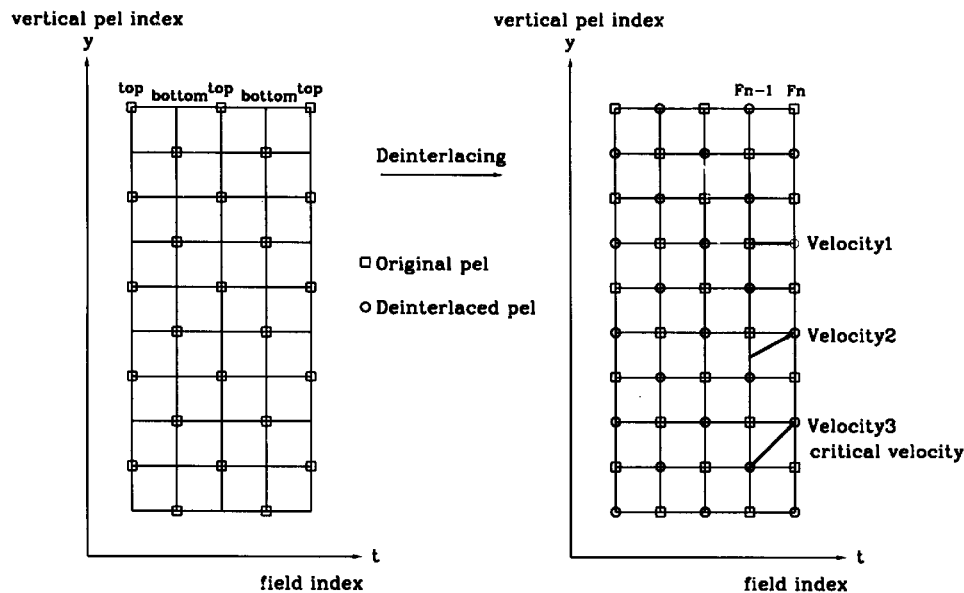
FIG. 1 is a diagram illustrating a deinterlacing process for video signals.

FIG. 1 is a diagram illustrating a deinterlacing method. In FIG. 1, the horizontal axis represents a field index whereas the vertical axis corresponds to a vertical pixel index.

Square boxes at cross points on the field index-pixel index plane of FIG. 1 represent original pixels, respectively. Circles at cross points on the field index-pixel index plane represent interpolated pixels, respectively.

Where the current field Fn deinterlaced is derived, original pixels may be brought, as they are, from the previous field Fn-1 to the current field Fn when they involve no motion, that is, they are still pixels. In FIG. 1, these pixels are expressed by a first velocity (Velocity1).

Figure 2:
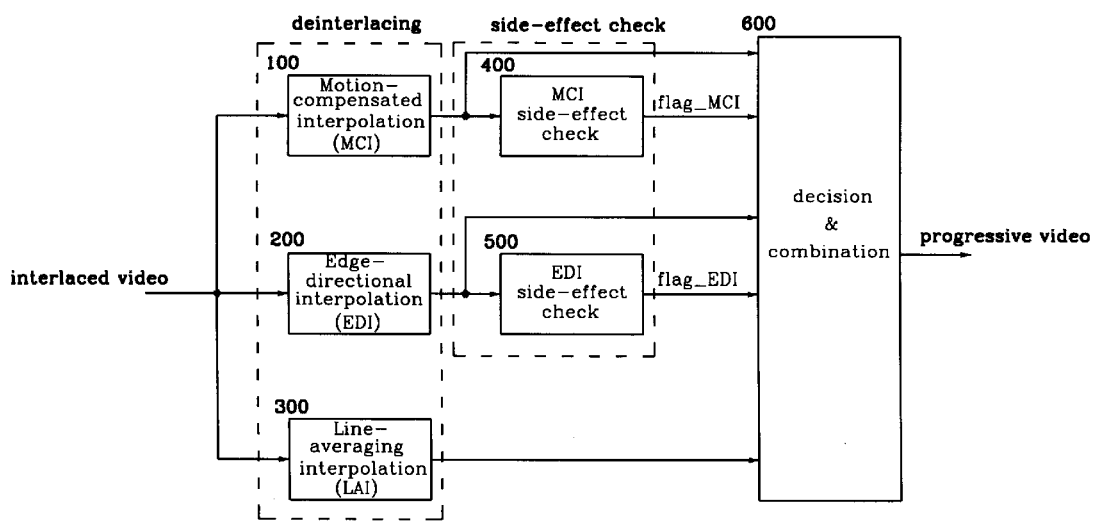
FIG. 2 is a block diagram illustrating an apparatus for deinterlacing video signals in accordance with the present invention.

On the other hand, for a pixel involving a motion at a velocity less than the critical velocity, a deinterlacing may be conducted, taking into consideration both the original pixel and the interpolated pixel. In FIG. 2, such a pixel is expressed by a second velocity (Velocity2).

Meanwhile, where pixels move upwardly or downwardly by a ½ pixel for a ¹⁄₆₀ second, that is, at the critical velocity (Velocity3), between successive fields, it is possible to bring only pixels, already interpolated, from the previous field Fn-1 to the current field Fn.

However, where such a situation, in which interpolated pixels are brought from the previous field to the current field, is repeated, an error propagation may occur because those pixels already interpolated in the previous field may involve an error.

For this reason, even though a motion is detected, it is impossible to carry out an MCI deinterlacing based on information from the detected motion.

Thus, videos, for which MCI operates effectively, are videos having a large part of complex and fine video regions and being still or moving slowly at a velocity less than the critical velocity.

On the other hand, where EDI operates for complex and fine regions of a video, it is impossible to avoid an erroneous operation.

This is because for a video portion (position) having no edge, EDI detects an edge direction determined to be most correct in accordance with an algorithm thereof, and conducts a pixel interpolation based on the detected edge direction. Therefore, the resulted interpolated pixel inevitably has an incorrect value.

However, EDI operates effectively for videos having distinct and elongated edges. This is because EDI is an interpolation method in which an edge is detected to conduct a pixel interpolation based on the direction of the detected edge.

Of course, MCI may rather have an erroneous operation possibility for the above mentioned video regions. This is because elongated edges of a video have similar shapes, thereby causing the motion detector to derive a motion vector irrespective of an actual motion in accordance with MCI.

Therefore, it is necessary to provide a deinterlacing method capable of utilizing advantages of MCI and EDI at most while reducing disadvantages involved in each of MCI and EDI.

The present invention proposes a video signal deinterlacing means capable of not only having the advantage of MCI, that is, the advantage of obtaining a satisfactory deinterlacing result for a video having a large part of complex and fine video regions and being still or moving slowly in a horizontal direction, but also having the advantage of EDI, that is, the advantage of obtaining a satisfactory deinterlacing result for a video having distinct and elongated edges.

That is, in accordance with the present invention, a video deinterlacing is carried out, based on a combination of MCI and EDI respectively capable of effectively operating for videos having different characteristics to obtain satisfactory results.

Accordingly, the present invention provides a video signal deinterlacing method and apparatus based on MCI and EDI which are configured to deinterlace an input video signal of an interlaced scan format in accordance with MCI and EDI schemes, respectively, checking whether or not the deinterlacing result according to the MCI scheme is satisfactory, checking whether or not the deinterlacing result according to the EDI scheme is satisfactory, and selectively outputting, as a final deinterlacing result, the value of the MCI deinterlacing result or the value of the EDI deinterlacing result, based on the result of the side-effect checking.

In the video signal deinterlacing method and apparatus based on MCI and EDI according to the present invention, where one of the MCI and EDI deinterlacing results is satisfactory, the satisfactory deinterlacing result is selected as a final deinterlacing result.

In the video signal deinterlacing method and apparatus based on MCI and EDI according to the present invention, where both MCI and EDI deinterlacing results are satisfactory, these satisfactory deinterlacing results are combined together so as to output the combined value as a final deinterlacing result.

The combination of the MCI and EDI deinterlacing results is achieved by deriving an average of the indices of two pixels respectively interlaced using the MCI and EDI. The average value is outputted as a final deinterlacing result.

The present invention also provides a video signal deinterlacing method and apparatus based on MCI and EDI which are configured to deinterlace an input video signal of an interlaced scan format in accordance with MCI, EDI and LAI schemes, respectively, checking whether or not the deinterlacing result according to the MCI scheme is satisfactory, checking whether or not the deinterlacing result according to the EDI scheme is satisfactory, and selectively outputting, as a final deinterlacing result, the value of the MCI deinterlacing result, the value of the EDI deinterlacing result, or the value of the LAI deinterlacing result, based on the result of the side-effect checking.

In this video signal deinterlacing method and apparatus based on MCI and EDI according to the present invention, where one of the MCI and EDI deinterlacing results is satisfactory, the satisfactory deinterlacing result is selected as a final deinterlacing result.

In the video signal deinterlacing method and apparatus based on MCI and EDI according to the present invention, where both the MCI and EDI deinterlacing results are satisfactory, these satisfactory deinterlacing results are combined together so as to output the combined value as a final deinterlacing result.

The combination of the MCI and EDI deinterlacing results is achieved by deriving an average of the indices of two pixels respectively interlaced using the MCI and EDI. The average value is outputted as a final deinterlacing result.

On the other hand, where neither the MCI deinterlacing result nor the EDI deinterlacing result is satisfactory, the LAI deinterlacing result is selected to be outputted as a final deinterlacing result.

FIG. 2 is a block diagram illustrating an apparatus for deinterlacing video signals, based on a combination of MCI and EDI in accordance with the present invention.

As shown in FIG. 2, the apparatus includes an MCI unit 100 for extracting motion information from a video signal of an interlaced scan format, and interpolating the pixels of the current field using those of the previous field, based on the extracted motion information.

An EDI unit 200 is also provided which serves to detect a video edge direction of the current field to be interpolated, and to interpolate empty lines of the current field based on the detected edge direction information.

The apparatus also includes an LAI unit 300 for deriving an average of the vertical indices of pixels arranged at the same field index position as a pixel to be currently interpolated in association with the current field, that is, an average vertical pixel index of pixel lines upwardly and downwardly adjacent to the current pixel line, and interpolating the current pixel using the derived average vertical pixel index.

The results respectively obtained after the input video signal of the interlaced scan format passes through the MCI unit 100, EDI unit 200, and LAI unit 300, are applied to a decision and combination logic 600.

The output from the MCI unit 100 is also inputted to an MCI side-effect checking unit 400, in addition to the inputting to the decision and combination logic 600. The MCI side-effect checking unit 400 determines whether or not the MCI deinterlacing result inputted thereto is satisfactory. The result of the determination, flag_MCI, is applied to the decision and combination logic 600.

The MCI side-effect checking unit 400 carries out the checking of whether or not the MCI deinterlacing is satisfactory, for every pixel.

The determination result flag_MCI outputted from the MCI side-effect checking unit 400 is a flag having a logic value of 1 or 0.

Where the MCI side-effect checking unit 400 determines the MCI deinterlacing result to meet a predetermined reference, it sets the flag, indicative of the checking result, to a logic value of 1, and outputs the set flag. On the other hand, where the MCI deinterlacing result does not meet the predetermined reference, the MCI side-effect checking unit 400 sets the flag to a logic value of 0, and outputs the set flag.

The output from the EDI unit 200 is also inputted to an EDI side-effect checking unit 500, in addition to the inputting to the decision and combination logic 600. The EDI side-effect checking unit 500 determines whether or not the EDI deinterlacing result inputted thereto is satisfactory. The result of the determination, flag_EDI, is applied to the decision and combination logic 600.

The EDI side-effect checking unit 500 carries out the checking of whether or not the EDI deinterlacing is satisfactory, for every pixel.

The determination result flag_EDI outputted from the EDI side-effect checking unit 500 is a flag having a logic value of 1 or 0.

Where the EDI side-effect checking unit 500 determines the EDI deinterlacing result to meet a predetermined reference, it sets the flag, indicative of the checking result, to a logic value of 1, and outputs the set flag. On the other hand, where the EDI deinterlacing result does not meet the predetermined reference, the EDI side-effect checking unit 500 sets the flag to a logic value of 0, and outputs the set flag.

The decision and combination logic 600 selects one of the output from the MCI unit 100 and the output from the EDI unit 200, based on the flags flag_MCI and flag_EDI, and outputs the selected value as a final deinterlacing result, that is, a video signal of a progressive scan format. Otherwise, the decision and combination logic 600 composes the outputs from the MCI and EDI units 100 and 200 together, and outputs the composed value as a final deinterlacing result.

For instance, the combination of the MCI and EDI deinterlacing results in the decision and combination logic 600 may be achieved by deriving an average of those MCI and EDI deinterlacing results.

The output value determination of the decision and combination logic 600 based on the flag values flag_MCI and flag_EDI, that is, the checking results from the MCI and EDI side-effect checking units 400 and 500, may be achieved as follows.

Where "flag_MCI" has a logic value of 1 whereas "flag_EDI" has a logic value of 0, the pixel index obtained in accordance with the MCI deinterlacing is selected and outputted.

This case corresponds to the case in which the input video signal is a video having a large part of complex and fine video regions being still or moving slowly in a horizontal direction.

For videos having a large part of complex and fine video regions being still or moving slowly in a horizontal direction, MCI exhibits an excellent performance. In the above mentioned case, accordingly, the pixel index obtained in accordance with the MCI deinterlacing is selected and outputted.

On the other hand, where "flag_MCI" has a logic value of 0 whereas "flag_EDI" has a logic value of 1, the pixel index obtained in accordance with the EDI deinterlacing is selected and outputted.

This case corresponds to the case in which the input video signal is a video having distinct and elongated edges.

EDI exhibits an excellent performance for videos having distinct and elongated edges. In the latter case, accordingly, the pixel index obtained in accordance with the EDI deinterlacing is selected and outputted.

Meanwhile, where both "flag_MCI" and "flag_EDI" have a logic value of 0, the pixel index obtained in accordance with the LAI deinterlacing is selected and outputted.

This case corresponds to the case in which neither the MCI deinterlacing result or the EDI deinterlacing result is satisfactory. In this case, neither the MCI or the EDI can ensure a satisfactory picture quality. Therefore, the pixel index obtained in accordance with the LAI deinterlacing is selected and outputted.

In addition, where both "flag_MCI" and "flag_EDI" have a logic value of 1, an average of the pixel index obtained in accordance with the MCI deinterlacing and the pixel index obtained in accordance with the EDI deinterlacing is derived and outputted.

This case corresponds to the case in which the input video signal is a video having distinct and elongated edges moving slowly in a horizontal direction.

In this case, a certain error concealment may also occur. In other words, the fact that both the MCI deinterlacing result and the EDI deinterlacing result are correct may rather be indicative of a high possibility of errors.

For example, a particular region of a picture, which must have a logic value of 1 only for the flag flag_MCI, may also have a logic value of 1 for the flag flag_EDI.

Where the method of selecting only one of two flags flag_MCI and flag_EDI is used in this case, an occasion that a pixel corresponding to a flag flag_EDI having a logic value of 1 is used may frequently occur.

In this case, a video distortion unpleasant to the eye may occur because the pixel interpolated in a particular video region has characteristics completely different from the video region.

Therefore, where both "flag_MCI" and "flag_EDI" have a logic value of 1, the average of the pixel index obtained in accordance with the MCI deinterlacing and the pixel index obtained in accordance with the EDI deinterlacing is taken in order to avoid the generation of extreme errors.

The MCI side-effect checking unit 400 and EDI side-effect checking unit 500 use side-effect checking algorithms completely different from each other, respectively.

However, the configuration of FIG. 2 is still used without any modification, irrespective of the side-effect checking algorithm used.

When the side-effect checking algorithm has an enhanced performance, the performance expected by the present invention is enhanced.

At any rate, it is noted that the present invention is characterized in that a video signal deinterlacing means is proposed which makes it possible to effectively use both the MCI deinterlacing and the EDI deinterlacing.

Using the above mentioned deinterlacing method and apparatus based on MCI and EDI in accordance with the present invention, it is possible to appropriately select a desired one of MCI and EDI on the basis of the characteristics of the video to be processed.

Also, the present invention makes it possible to allow the MCI and EDI methods to be combined together in a video deinterlacing system.

In addition, in accordance with the present invention, MCI and EDI results are checked to select a desired one of those results determined to be most appropriate. Accordingly, it is possible to minimize a degradation in picture quality occurring when a video of an interlaced scan format is deinterlaced into a video of a progressive scan format. Thus, videos of the progressive format with a high picture quality can be obtained.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A deinterlacing method based on a motion-compensated interpolation (MCI) and an edge-directional interpolation (EDI) comprising:

deinterlacing an input video signal of an interlaced scan format in accordance with MCI, EDI and line averaging interpolation (LAI) schemes, respectively;

checking whether or not the result of the deinterlacing according to the MCI scheme is satisfactory and for checking whether or not the result of the deinterlacing according to the EDI scheme is satisfactory; and selecting a final deinterlacing result based on the result of the checking, wherein the selected final deinterlacing result selectively changes between either the MCI deinterlacing result, the EDI deinterlacing result, or the LAI deinterlacing result for the input video signal, and wherein the LAI deinterlacing result is selected when neither the MCI deinterlacing result nor the EDI deinterlacing result is determined to be satisfactory.

2. The deinterlacing method according to claim 1, wherein the selected final deinterlacing result is either the MCI deinterlacing result, the EDI deinterlacing result, the LAI deinterlacing result, or a combined value of the MCI and EDI deinterlacing results.

3. The deinterlacing method according to claim 2, wherein the combined value of the MCI and EDI deinterlacing results is selected when both the MCI deinterlacing result and the EDI deinterlacing result are determined to be satisfactory at the side-effect checking step.

4. The deinterlacing method according to claim 2, wherein the combined value of the MCI and EDI deinterlacing results is an average of a pixel index obtained in accordance with the MCI deinterlacing and a pixel index obtained in accordance with the EDI deinterlacing.

5. The deinterlacing method according to claim 1, wherein the selected final deinterlacing result is either the MCI deinterlacing result or the EDI deinterlacing result depending on which result is determined to be satisfactory.

6. A deinterlacing apparatus based on a motion-compensated interpolation (MCI) and an edge-directional interpolation (EDI) comprising:

an MCI unit for deinterlacing an input video signal of an interlaced scan format, based on an MCI scheme;

an EDI unit for deinterlacing the input video signal of the interlaced scan format, based on an EDI scheme;

a line averaging interpolation (LAI) unit for deinterlacing the input video signal of the interlaced scan format, based on an LAI scheme;

MCI side-effect checking means for checking whether or not a deinterlacing result outputted from the MCI unit is satisfactory;

EDI side-effect checking means for checking whether or not a deinterlacing result outputted from the EDI unit is satisfactory; and decision means for selecting either the deinterlacing result outputted from the MCI unit, the deinterlacing result outputted from the EDI unit, or the deinterlacing result outputted from the LAI unit, based on respective side-effect checking results outputted from the MCI and EDI side-effect checking means, wherein the decision means selects, based on the side-effect checking results, the deinterlacing result outputted from the MCI unit when only the deinterlacing result outputted from the MCI unit is determined to be satisfactory, and selects the deinterlacing result outputted from the EDI unit when only the deinterlacing result outputted from the EDI unit is determined to be satisfactory, while selecting the deinterlacing result outputted from the LAI unit when both the deinterlacing results respectively outputted from the MCI and EDI units are determined to be unsatisfactory.

7. The deinterlacing apparatus according to claim 6, further comprising:

means for combining the resultant video signal outputted from the MCI unit with the resultant video signal outputted from the EDI unit, wherein the decision means selects either the deinterlacing result outputted from the MCI unit, the deinterlacing result outputted from the EDI unit, the deinterlacing result outputted from the LAI unit, or a combined value of the MCI and EDI deinterlacing results outputted from the combining means.

8. The deinterlacing apparatus according to claim 7, wherein the decision means further comprises means for combining the resultant video signal outputted from the MCI unit with the resultant video signal outputted from the EDI unit so that it serves as decision and combination means.

9. The deinterlacing apparatus according to claim 7, wherein the combined value of the MCI and EDI deinterlacing results is an average of a pixel index obtained in accordance with the MCI deinterlacing and a pixel index obtained in accordance with the EDI deinterlacing.

10. The deinterlacing apparatus according to claim 7, wherein the combination of the MCI and EDI deinterlacing results is carried out only when the combined value of the MCI and EDI deinterlacing results is selected, based on the side-effect checking results respectively outputted from the MCI and EDI side-effect checking means.

11. The deinterlacing apparatus according to claim 7, wherein the decision means selects, the deinterlacing result outputted from the MCI unit when only the deinterlacing result outputted from the MCI unit is determined to be satisfactory, selects the deinterlacing result outputted from the EDI unit when only the deinterlacing result outputted from the EDI unit is determined to be satisfactory, selects the deinterlacing result outputted from the LAI unit when neither the deinterlacing result outputted from the MCI unit nor the deinterlacing result outputted from the EDI unit is determined to be satisfactory, while selecting the combined value of the MCI and EDI deinterlacing results when both the deinterlacing results respectively outputted from the MCI and EDI units are determined to be satisfactory.

12. A deinterlacing method based on a motion-compensated interpolation (MCI) and an edge-directional interpolation (EDI) comprising:

deinterlacing an input video signal of an interlaced scan format in accordance with MCI and EDI schemes, respectively;

checking whether the result of the deinterlacing according to the MCI scheme is satisfactory and checking whether the result of the deinterlacing according to the EDI scheme is satisfactory by comparison to respective first and second threshold values, wherein if the first or second threshold value is met, then a first or second flag, respectively, is set to a logic value of 1; and selecting a final deinterlacing result, based on whether a flag is set to the logic value of 1 as a result of the checking, wherein the selected final deinterlacing result selectively changes between either the MCI deinterlacing result or the EDI deinterlacing result depending on whether the first or second flag, respectively, is set to the logic value of 1.

* * * * *